US007728455B2

(12) United States Patent
Branco (10) Patent No.: US 7,728,455 B2
(45) Date of Patent: Jun. 1, 2010

(54) PARABOLIC BI-DIRECTIONAL WIND TURBINE ASSEMBLY AND OMNI-DIRECTIONAL POWER ARRAY (76) Inventor: Anthony Branco, 147 Pebble Beach Cir., Naples, FL (US) 34113

( * ) Notice: Subject to any disclaimer, the term of this patent is extended or adjusted under 35 U.S.C. 154(b) by 335 days.

(21) Appl. No.: 11/977,246

(22) Filed: Oct. 24, 2007

(65) Prior Publication Data
US 2008/0315592 A1 Dec. 25, 2008

Related U.S. Application Data (60) Provisional application No. 60/937,030, filed on Jun. 25, 2007.

(51) Int. Cl.
F03D 9/00 (2006.01)
H02P 9/04 (2006.01)
(52) U.S. Cl. .......................... 290/55; 290/44
(58) Field of Classification Search ............. 290/44, 290/45; 415/4.1, 4.2, 4.4, 4.5, 4.3, 7; 60/398, 60/364, 367; 416/7, 132 B
See application file for complete search history.

(56) References Cited

U.S. PATENT DOCUMENTS

| 2,169,165 | A | * | 8/1939 | Reedy | 416/9 |
|---|---|---|---|---|---|
| 4,140,433 | A | * | 2/1979 | Eckel | 415/209.1 |
| 4,218,175 | A | * | 8/1980 | Carpenter | 415/219.1 |
| 5,394,016 | A | * | 2/1995 | Hickey | 290/55 |
| 6,877,948 | B2 | * | 4/2005 | Cutcher | 415/4.4 |
| 6,929,671 | B2 | * | 8/2005 | Kim et al. | 55/385.1 |
| 7,112,893 | B1 | * | 9/2006 | Villanueva | 290/55 |
| 7,323,791 | B2 | * | 1/2008 | Jonsson | 290/55 |
| 7,528,498 | B2 | * | 5/2009 | Yeh | 290/55 |
| 2005/0242590 | A1 | * | 11/2005 | Zambrano et al. | 290/44 |
| 2006/0171798 | A1 | * | 8/2006 | Yamamoto et al. | 415/4.5 |
| 2007/0009348 | A1 | * | 1/2007 | Chen | 415/2.1 |
| 2007/0126240 | A1 | * | 6/2007 | Richards et al. | 290/55 |

* cited by examiner

Primary Examiner—Julio Gonzalez (57) ABSTRACT

An omni-direction array 22 of wind turbine assemblies 10 is positioned upon and about the periphery of the roof of a building. Each wind turbine assembly 10 comprises a self supporting modular box-shaped housing 12 having an inlet and outlet for accelerating the flow of air therethrough. Turbine 14 comprises a hub 27, a peripheral band 28 and vanes 25 having proximal and distal ends positioned there between and having a ring gear 18 positioned on the peripheral band in mechanical communication with a plurality of generators 20 for converting wind energy into electricity. Parabolic collectors 16 are positioned and attached to the inlet and outlet of the housing 12 for collecting, concentrating, directing and accelerating wind through the turbine 14 in the throat section of the assembly. Each self supporting box-shaped modular housing 12 is structurally communicated with other housings 12 by interlocking mating surfaces 26.

15 Claims, 7 Drawing Sheets

PARABOLIC BI-DIRECTIONAL WIND TURBINE ASSEMBLY AND OMNI-DIRECTIONAL POWER ARRAY

CROSS REFERENCE TO RELATED APPLICATIONS

This application claims the benefit of Provisional Patent Application 60/937,030 filed on Jun. 25, 2007, filed by the present inventor.

FEDERALLY SPONSORED RESEARCH

None

SEQUENCE LISTING

None

BACKGROUND OF THE INVENTION

This invention relates to wind turbine technology and specifically to utilization of wind energy for providing the needed electricity to power urban hi-rise buildings. The concept of direct wind to electrical conversion is well known and many prior art documents are available.

U.S. Pat. No. 4,220,870 (1980) to Kelly shows the concept of providing a lattice array of mini-turbo/generator modules positioned on a roof top of a building. Due to the vertical orientation of the generators and the structural limitations of the turbines set forth in Kelly, wind entering one side of the turbine counters the wind entering the other end of the turbine and therefore reduces the effectiveness of the turbines ability to generate electricity.

U.S. Pat. No. 6,710,469 (2004) to McDavid, Jr. teaches a wind turbine energy conversion system utilizing a sloping parabolic floor for accelerating wind to the turbine.

U.S. Pat. No. 6,756,696 (2004) to Ohya et al teaches a wind power generator having a collar shaped brim formed on the outside of the outlet opening of the wind tunnel body.

U.S. Pat. No. 5,969,430 (1999) to Forrey shows the overall combination of an installation which consists of horizontal dual turbine cells connected in tandem to drive generators. Banks of batteries are stacked vertically to form arrays which harness the wind energy.

U.S. Pat. No. 1,876,595 (1932) to Beldilmano shows a plurality of wind turbine devices suspended in an array between towers by wire ropes.

SUMMARY OF THE INVENTION

My invention solves the problem of the prior art by providing an array of horizontally oriented parabolic wind turbine assemblies positioned around the periphery of the roof of a building. By such implementation any group of turbine assemblies would function to generate electricity regardless of the wind direction. This omni-directional system contemplates a plurality of parabolic bi-directional wind turbine assemblies stacked one above the other and around the periphery of the roof of the building.

My invention also provides a novel wind turbine assembly having a parabolic inlet and outlet for accelerating wind through a throat section thereof and thereby utilizing this accelerated wind to drive a turbine and a plurality of generators for generating electricity for the building. Each wind turbine assembly is positioned in a self supporting box-shaped modular housing and is sized to be easily brought up to the roof through the existing elevators or stairwells of the building. They are of such size and weight to be easily mounted one above the other to create a bank of wind turbine assemblies in an array which can be considered to be a "mini-grid". Their design also lends itself to ease of assembly due to prefabricated mounting means on each modular housing. This configuration and modular component design allows maintenance to be performed by standard building mechanical contractors. Another aspect of the invention includes a structural support system for a multi-story wind power plant supported by an interconnected framework of interlocking box-shaped modular housings thereby creating a rigid super-structure which can be manufactured off-site and assembled on the building roof.

The major challenge to using wind as a source of energy is that the wind velocity is variable. The problem with traditional wind turbine design is that they perform well within a relatively narrow range of wind speeds. When wind speeds are low, sufficient power is not produced, and when wind speeds are high and the potential power generation is the greatest, traditional turbines are slowed or stopped completely to avoid wind shear damage. Another challenge to using traditional wind turbines is that the pitch of the turbine is varied to regulate torque or resultant speed of the turbine thereby requiring complex control mechanisms which are costly to manufacture, maintain and repair.

One advantage of my invention is that my parabolic bi-directional wind turbine assembly generates power at both high and low wind velocity. Other advantages of my design are that no transmission lines are necessary because the electricity generated is produced on site and therefore does not require large tracks of land for building wind farms and the need for high maintenance towers and specialized support staff. Another advantage of the present invention is the significant reduction in complex systems that require petroleum products such as transmissions and oil cooling systems required with traditional utility grade wind turbines.

The advantages of the invention will become apparent from the study of the following description and the accompanying drawings. It should be understood that variations may be made in the details and general features of the design concept without departing from the spirit and scope of the invention. For example, the design of the instant invention could be implemented on a building of circular, triangular, trapezoidal or any other geometric shape. The use of interlocking linkage and mating surfaces with the prefabricated mounting means on each modular housing allows for easy connection to other modular housings and the flexibility to form various geometric shapes. In addition, my invention has other environmental applications such as off shore drilling platforms, transportation and remote test locations where utility power is unavailable, as well as any other environments where wind energy can be harvested to generate electricity.

DETAILED DESCRIPTION OF THE PREFERRED EMBODIMENT

Figure 1:
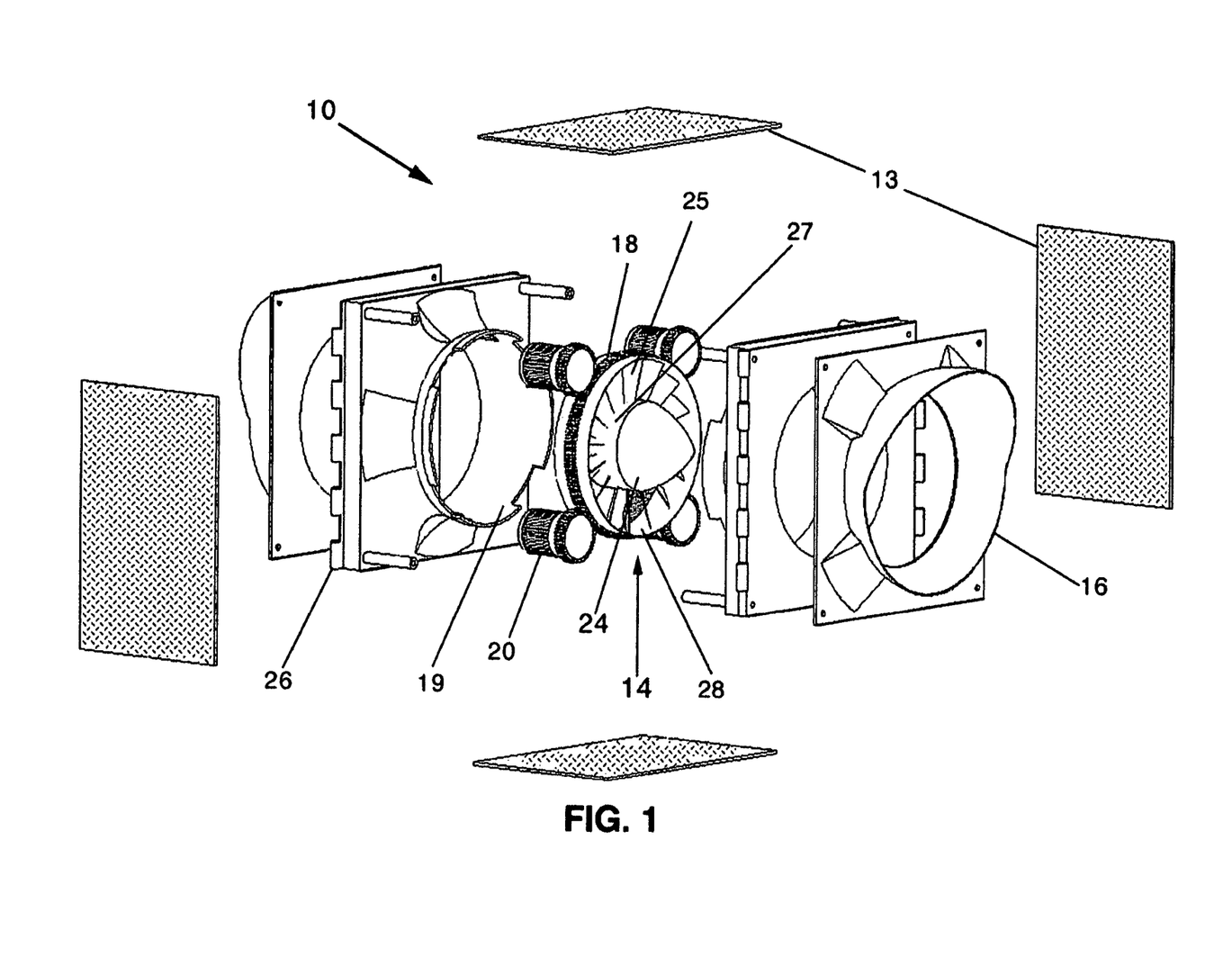
FIG. 1 is an exploded view of the wind turbine assembly of the present invention.

FIG. 1 is an exploded view of the turbine assembly 10 of the present invention. Turbine 14 is supported and positioned within the throat section 19 of the self supporting box-shaped modular housing 12. Attached to the periphery of the turbine 14 is a ring gear 18 which is in mechanical communication with a plurality of generators 20. This mechanical communication between the ring gear 18 and the generators 20 can take the shape of many well know expediencies within the purview of a person having ordinary skill in the art. Parabolically shaped collectors 16 are positioned and attached to the inlet and outlet of housing 12. These collectors 16 are designed to collect, concentrate and direct wind through the throat section 19 at an accelerated rate. Nose cone 24 mounted on the turbine directs the accelerated wind to the distal ends thereof so that maximum torque is transferred to the turbine for producing optimum energy for any given wind speed. As the wind enters the housing 12, the cross sectional area is reduced 3 to 1 as it passes from the collector 16 through the throat section 19 and outwardly from the nose cone 24. The accelerated wind rotates the turbine 14 and this rotational motion is converted into electricity by the generators 20. Access or cover panels 13 provide the top section, the bottom section and side sections which when assembled with turbine assembly 10 encapsulates the wind turbine assembly of the present invention. It should be noted that the turbine assembly 10 as shown in FIG. 1 is designed such that wind entering the assembly from one direction will generate electricity and when the wind is blowing from the opposite direction and enters the turbine assembly 10 from the other side that electricity will also be generated. All of the moving parts of the turbine assembly 10 are enclosed in housing 12. The materials used would be dependent upon the parameters required for a particular turbine assembly implementation. It is contemplated that the materials used for all parts inside and out could be aluminum, titanium, stainless steel, PVC composite, ABS, UV-stabilized high density polyethylene (HDPE) or combinations thereof.

Figure 2:
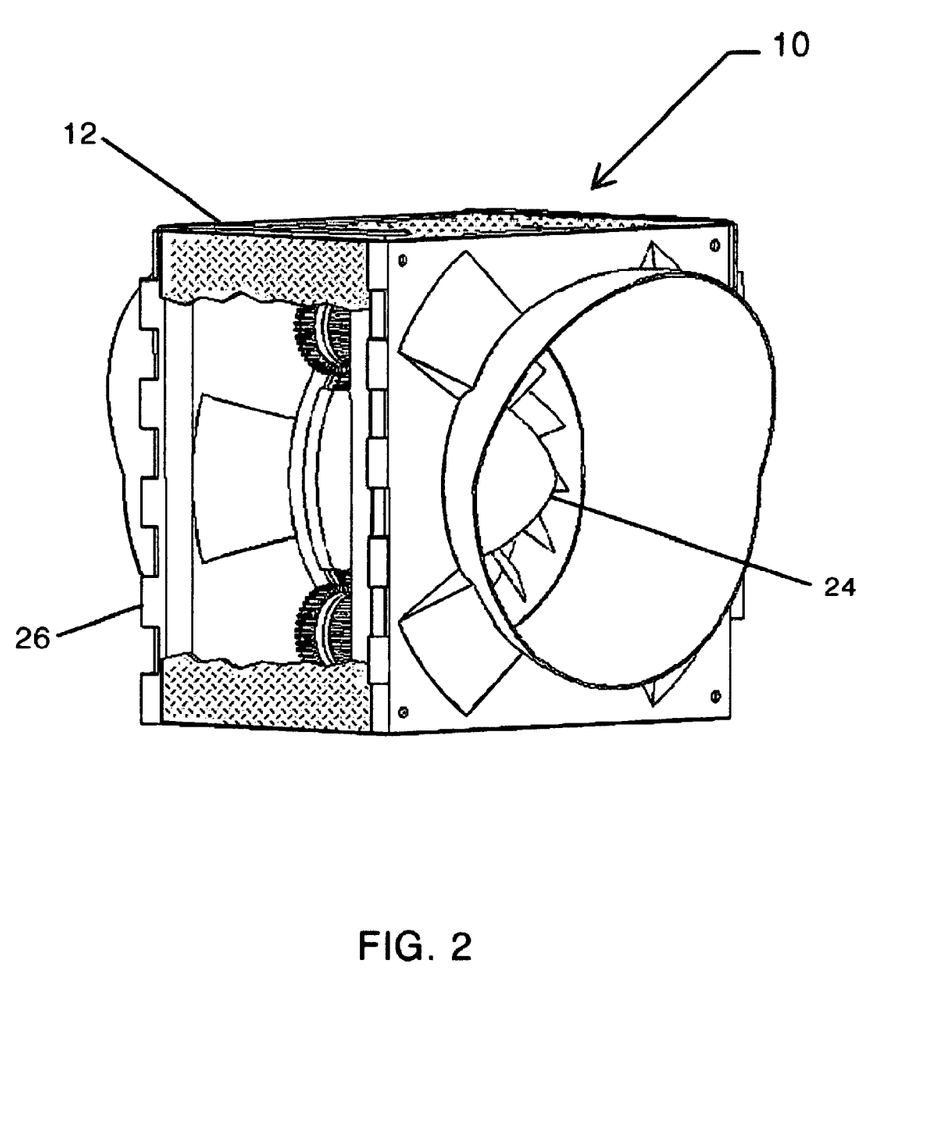
FIG. 2 is a perspective cutaway view of the wind turbine assembly positioned in a self supporting box-shaped modular housing.

FIG. 2 is a perspective cutaway view of the present invention which shows the wind turbine assembly 10 with panels 13 in place to form the self supporting box-shaped modular housing 12. Prefabricated mounting means 26 are provided so that a plurality of modular housings 12 can be fastened together to form an array of turbine assemblies 10 constituting a mini grid for generating electricity. These mounting means have interlocking mating surfaces 26 and features that allow the modular housings 12 to be joined and locked together into a multi-tiered building block superstructure which accommodates various shapes consistent with building design. Such flexibility readily facilitates the assembly of rectangular, pyramidal, circular or dome superstructures on the roof tops of high rise buildings.

Figure 3:
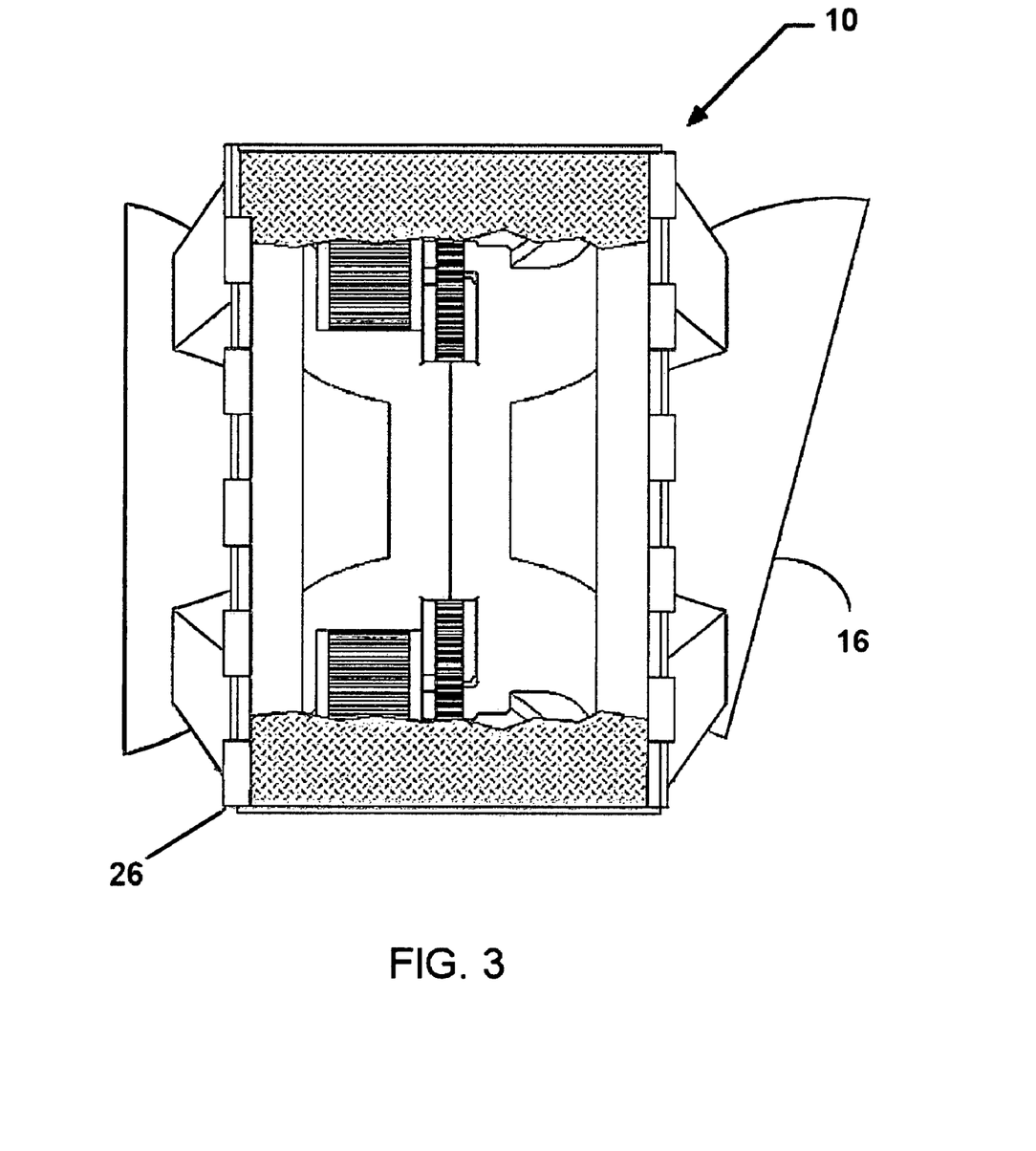
FIG. 3 is a side view of the wind turbine assembly having a horizontal axis.

FIG. 3 is a side view of the self supporting box-shaped modular housing 12 enclosing the wind turbine assembly 10 of the instant invention. It should be noted that the housing is a horizontal axis machine and operates when wind enters the housing 12 from a horizontal direction. Parabolic collector 16 is designed such that it can collect updraft wind which is rising vertically along the building. It is also contemplated that the housing 12 could be rotated and function as a vertical axis machine given a set of parameters which would require such implementation.

Figure 4:
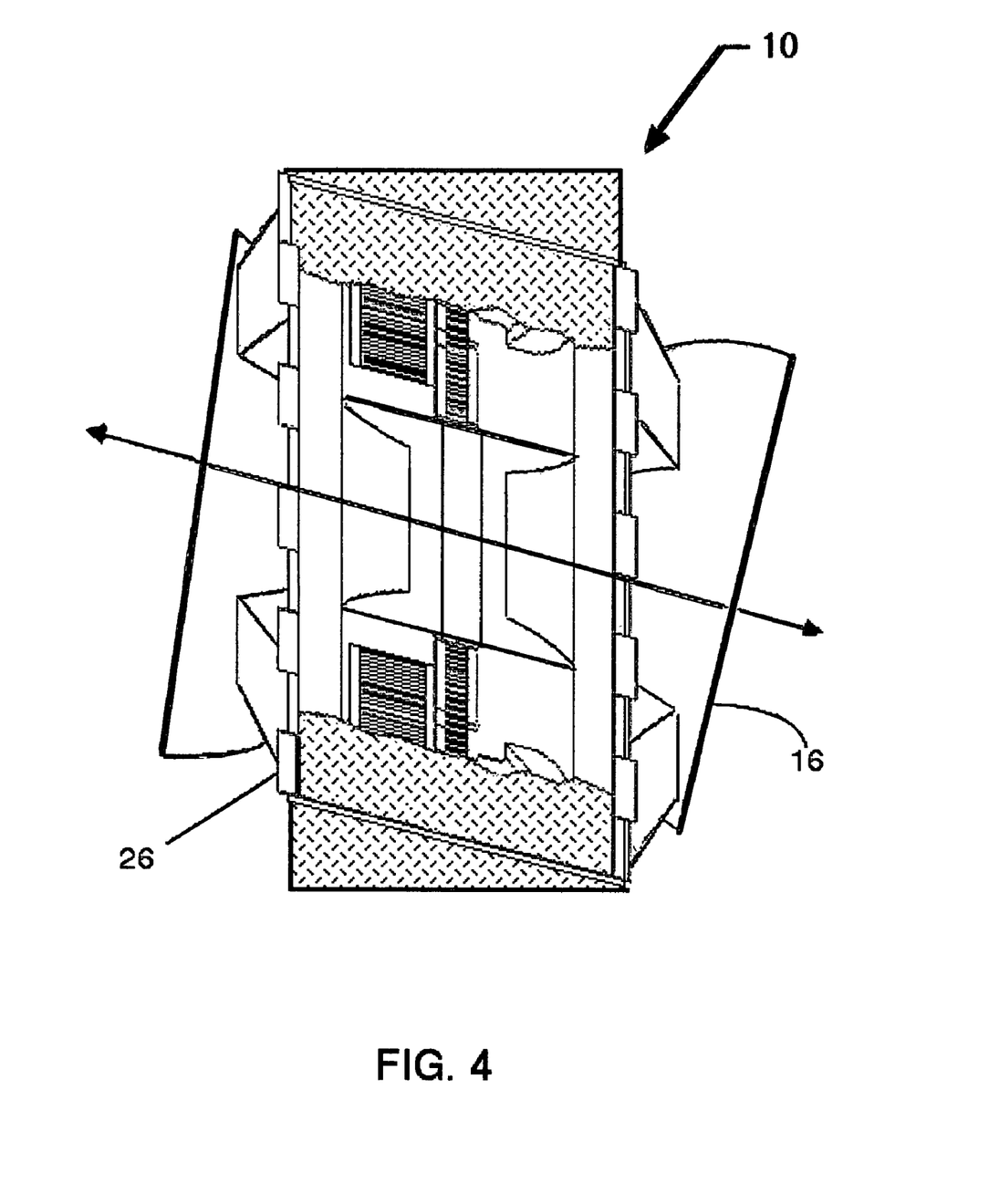
FIG. 4 is a side view of the wind turbine assembly having an angled axis.

FIG. 4 is a side view of the self supporting box-shaped modular housing 12 enclosing the wind turbine assembly 10 of the instant invention. This design shows an angled axis machine which could be utilized in certain design situations to more efficiently capture and convert the angular updraft winds encountered on hi rise rooftop applications.

Figure 5:
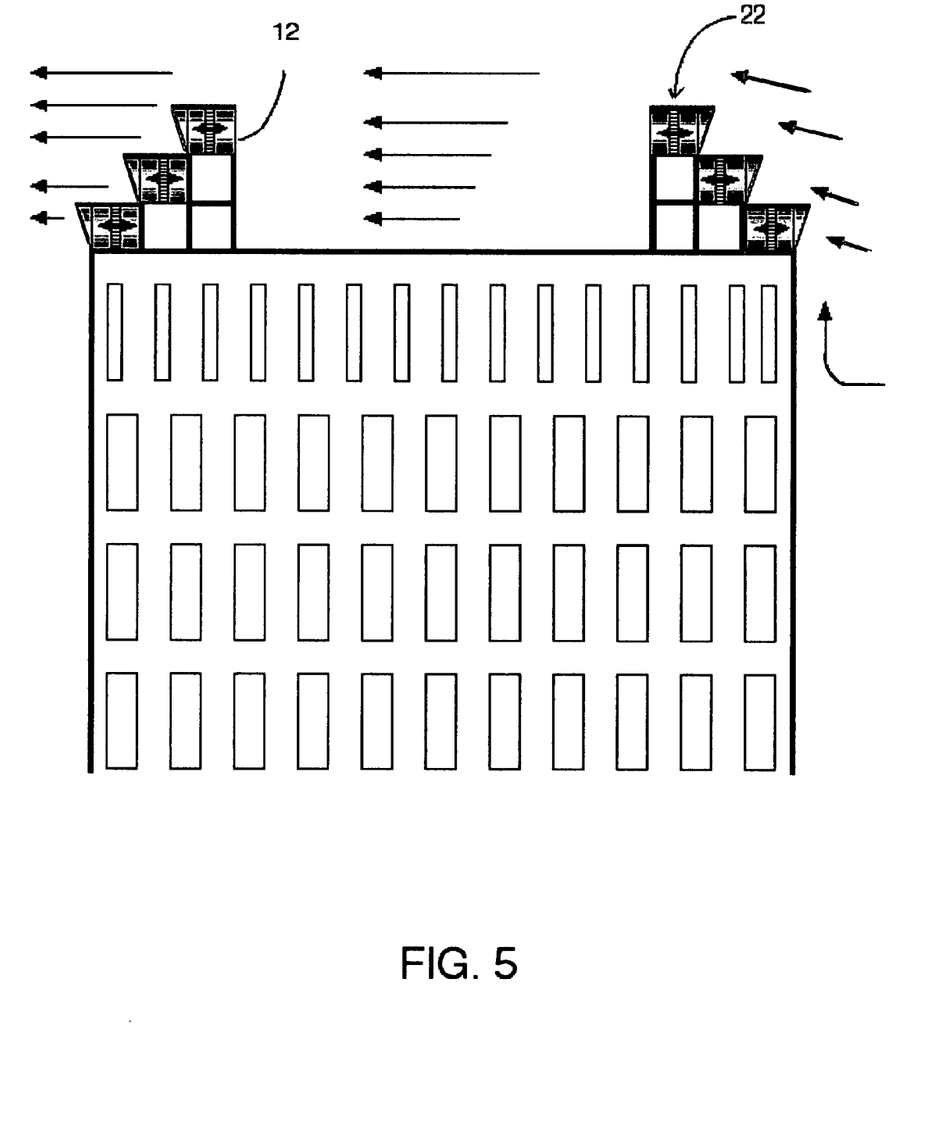
FIG. 5 is a side view of a three tiered omni-directional array of wind turbine assemblies positioned upon the roof at opposite ends of a building and associated wind patterns.

FIG. 5 is a side view of a three tiered omni-directional array 22 of wind turbine assemblies 10 positioned about the periphery of the building and may be positioned adjacent to each other and/or stacked one above the other in order to maximize the conversion of wind energy into electricity. The direction arrows in FIG. 5 depict how the omni-directional array harnesses the wind two times, to efficiently generate electricity. The first energy conversion takes place when the wind enters the intake parabolic collectors 16 of the array 22 on the leading edge or windward side of the building. The second energy conversion takes place when the wind continues across the rooftop and is harnessed and accelerated through another array of wind turbine assemblies 10. It is contemplated that the array 22 can be made up of as many self supporting box-shaped modular housings 12 as necessary in both the horizontal and vertical directions and can be interconnected into a building block superstructure utilizing the interlocking mating surfaces 26 on each modular housing 12. The design and overall shape of the array further improves the efficiency of the system by creating an air dam and thereby increasing the air pressure entering the wind turbine assemblies 10 on the trailing side of the building.

Figure 6:
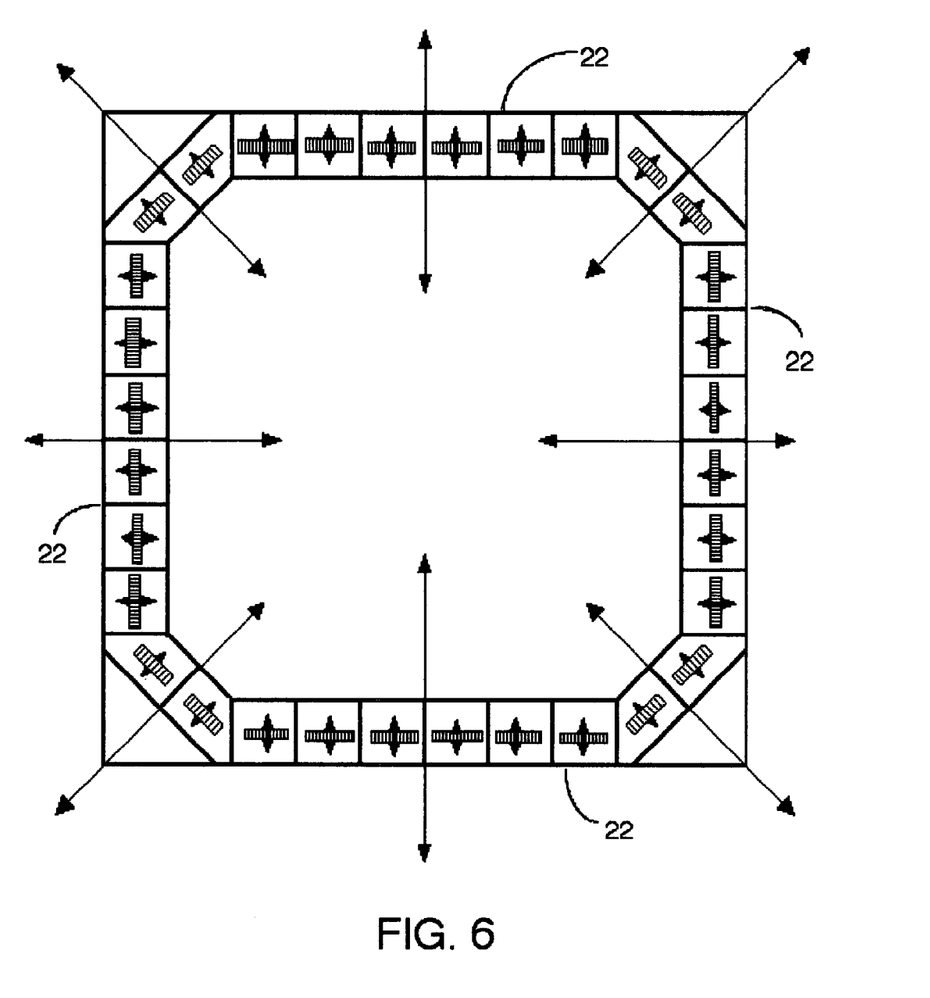
FIG. 6 is a top view of a typical building showing a plurality of single tiered arrays positioned around the perimeter on the roof top of the building and associated wind patterns.

FIG. 6 is a top view of a typical urban building showing the wind patterns traversing the roof between pairs of single tiered omni-directional arrays 22. As the wind flows across the rooftop at the opposite ends of the building, wind is harnessed two times as it is collected, concentrated and accelerated in each array 22.

Figure 7:
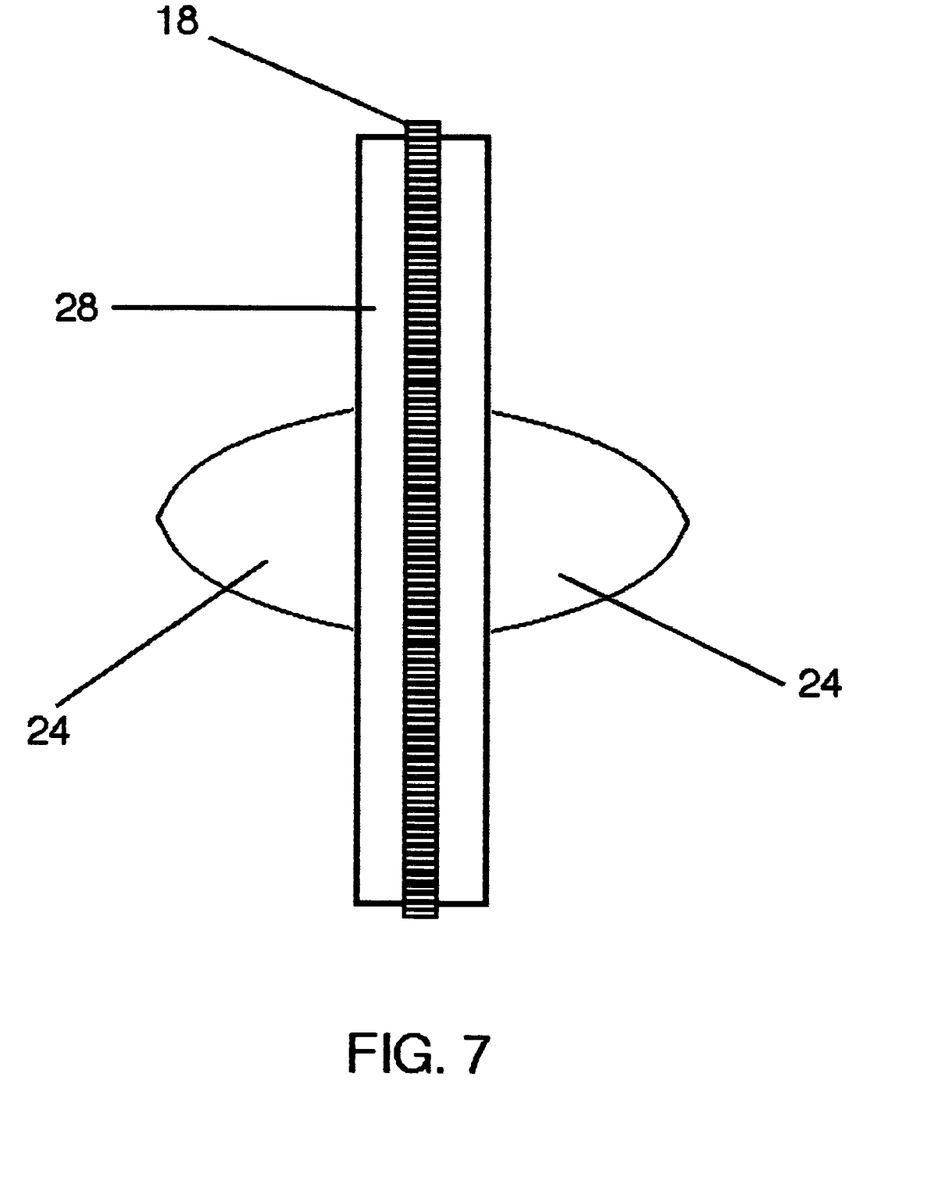
FIG. 7 is a detailed view of the turbine showing the hub and nose cones on each side thereof.

FIG. 7 is an enlarged view of the turbine 14 with blades 25 in structural communication between hub 27 with peripheral band 28. Ring gear 18 is positioned on band 28 and is in direct structural communication with generators 20. A pair of nose cones 24 is positioned at both ends of the hub 27 to direct wind outwardly and in such a manner that the turbine 14 can rotate irregardless of the wind direction.

Numerals
10. turbine assembly
12. self supporting box-shaped modular housing
13. cover panels
14. turbine
16. parabolic collector
18. ring gear
19. throat section
20. generators
22. omni-directional arrays
24. nose cones
25. vanes
26. interlocking mating surfaces
27. hub
28. peripheral band Operation The omni-directional array 22 of parabolic bi-directional wind turbine assemblies 10 operates to harness the energy of the wind and generate electricity to power a large building in an urban area. The array 22 of turbine assemblies 10 is positioned upon the roof of the building in a manner which allows utilization of wind energy irregardless of wind direction. If the wind is blowing in one direction at least two arrays 22 of turbine assemblies 10 on opposite sides of the building will harness the wind and direct this energy to drive the generators 20. If the wind is blowing in a different direction at least two other arrays of the turbine assemblies 10 will harness the wind energy and drive multiple generators 20 to produce electricity.

The plurality of generators 20 can be progressively engaged as the turbine speed increases. It is contemplated that as the electricity is generated by the omni-directional arrays 22 of the turbines assemblies 10 positioned upon the building roof, that the top floors of the building would initially utilize the generated electricity. As wind velocity increases and more electricity is generated, the lower floors would utilize the generated electricity until all floors were "on line". If more energy is obtained than necessary for the building's needs, then the extra electricity can be stored in batteries or optionally sold to the local power grid. The specific design of the assembly is such that one revolution of the wind turbine assembly results in eighteen to twenty revolutions of the generator with a direct drive interface or multiple times that with additional gears added.

The number of omni-directional wind powered arrays 22 would be dependent upon the power needs of the building and the physical limitations of the roof surface. Generated power would be distributed by industry standard paralleling control switch gear that balances building electrical load to wind generated power. The electrical circuitry for controlling the flow of electricity from the generators is standard "off the shelf" components including controllers, rectifiers, synchronous inverters and batteries as would be well known to a person having ordinary skill in the art.

The invention claimed is:

1. A parabolic bi-directional wind turbine assembly for converting wind energy into electricity comprising; a self supporting modular box-shaped housing having an inlet and outlet with a throat section positioned therebetween, a turbine positioned in said throat section, said turbine comprising a hub, a peripheral band and vanes having proximal and distal ends positioned therebetween, a ring gear positioned on said peripheral band, a plurality of generators in mechanical communication with said ring gear, parabolic collectors positioned and attached to said inlet and said outlet for collecting, concentrating, directing and accelerating wind through the turbine at the throat section, a nose cone positioned on both ends of the hub for directing the accelerated wind outwardly to said distal ends of the vanes so that maximum torque is transferred to the turbine whereby the rotational energy of the turbine is converted into electricity by the generators.

2. The parabolic wind turbine assembly according to claim 1, wherein each self supporting modular box-shaped housing has interlocking mating surfaces, and wherein a plurality of the self supporting box-shaped modular housings are structurally joined and locked to each other to create an energy array in the form of a rigid building block superstructure.

3. The parabolic wind turbine assembly according to claim 2, wherein the rigid building block superstructure is multitiered.

4. The parabolic wind turbine assembly according to claim 1, wherein materials used to fabricate said assembly is selected from the group consisting of aluminum, titanium, stainless steel, PVC composite, ABS, HDPE or combinations thereof.

5. The parabolic wind turbine assembly according to claim 1, wherein the assembly is positioned about a horizontal axis and that the wind accelerates through the assembly horizontally.

6. The parabolic wind turbine assembly according to claim 1, wherein the assembly is configured about an angled axis and that the wind accelerates through the assembly at an angle to horizontal.

7. An omni-directional wind powered array mounted on a roof of a building comprising: a plurality of self supporting-box shaped modular housings each containing a parabolic bi-directional wind powered turbine assembly positioned upon and around the periphery of the roof of a building, each self supporting box-shaped modular housing having, interlocking mating surfaces including means to join and lock other self supporting box-shaped modular housings into at least one array in the form of a rigid building block superstructure, each wind powered turbine assembly being in mechanical communication with at least one generator whereby electricity is generated as the wind passes through said at least one array and traverses the roof of the building irregardless of the wind direction.

8. The omni-directional wind powered array of claim 7 further comprising a plurality of arrays positioned upon the roof of the building on a plurality of opposite ends thereof and wherein as the wind traverses the roof of the building in a plurality of directions, electricity is generated in said plurality of arrays.

9. The omni-directional wind powered array of claim 7, wherein the building block superstructure is multitiered.

10. The omni-directional wind powered array of claim 7, wherein materials used to fabricate said assembly is selected from the group consisting of aluminum, titanium, stainless steel, PVC composite, ABS, HDPE or combinations thereof.

11. An omni-directional wind powered array to be mounted on a roof of a building comprising: a plurality of wind turbine assemblies positioned upon and around the periphery of the roof of a building, each assembly being horizontally mounted and stacked in an array, each assembly is in mechanical communication with at least one generator, wherein each assembly comprises a self supporting modular box-shaped housing having an inlet and outlet with a throat section positioned therebetween, a turbine positioned in said throat section, said turbine comprising a hub, a peripheral band and vanes having proximal and distal ends positioned therebetween, a ring gear positioned on said peripheral band, and at least one generator in mechanical communication with said ring gear, parabolic collectors positioned and attached to said inlet and said outlet for collecting, concentrating, directing and accelerating wind to said turbine, a nose cone positioned on both ends of the hub, for directing the accelerated wind outwardly therefrom to said distal ends of the vanes so that maximum torque is transferred to said ring gear and at least one generator.

12. The omni-directional wind powered array as set forth in claim 11, wherein each self supporting modular box-shaped housing includes interlocking mating surfaces, and wherein the array comprises a plurality of self supporting box-shaped modular housings structurally joined and locked together by said interlocking mating surfaces to create an energy array in the form of a rigid building block superstructure.

13. The omni-directional wind powered array as set forth in claim 12, wherein the building block superstructure is multitiered.

14. The omni-directional wind powered array as set forth in claim 12 further comprising a plurality of arrays positioned on top of a roof of a building on opposite ends thereof and wherein as the wind traverses the roof of the building in a plurality of directions, electricity is generated in the plurality of arrays.

15. The omni-directional wind powered array as set forth in claim 11, wherein materials used to fabricate said array is selected form the group consisting of aluminum, titanium, stainless steel, PVC composite, ABS, HDPE or combinations thereof.

* * * * *